(12) United States Patent
Baker

(10) Patent No.: US 6,961,203 B1
(45) Date of Patent: Nov. 1, 2005

(54) HYBRID PRINTED SERVO PATTERNS FOR MAGNETIC MEDIA AND HARD DISK SYSTEMS IMPLEMENTING SAME

(75) Inventor: Bill R. Baker, Redwood City, CA (US)

(73) Assignee: Maxtor Corporation, Longmont, CO (US)

(*) Notice: Subject to any disclaimer, the term of this patent is extended or adjusted under 35 U.S.C. 154(b) by 164 days.

(21) Appl. No.: 10/251,342

(22) Filed: Sep. 20, 2002

Related U.S. Application Data

(63) Continuation-in-part of application No. 10/060,914, filed on Jan. 29, 2002, now abandoned.

(60) Provisional application No. 60/273,561, filed on Mar. 6, 2001.

(51) Int. Cl.[7] .............................................. G11B 5/596
(52) U.S. Cl. .................................... 360/77.08; 360/75
(58) Field of Search .............................. 360/77.08, 48, 360/49, 51, 75, 77.02, 77.05, 77.07, 77.11

(56) References Cited

U.S. PATENT DOCUMENTS

| | | |
|---|---|---|
| 3,686,649 A | 8/1972 | Behr |
| 4,549,232 A * | 10/1985 | Axmear et al. .......... 360/77.07 |
| 5,339,204 A | 8/1994 | James et al. |
| 5,448,429 A | 9/1995 | Cribbs et al. |
| 5,541,784 A | 7/1996 | Cribbs et al. |
| 5,583,712 A | 12/1996 | Brunelle |
| 5,668,679 A | 9/1997 | Swearingen et al. |
| 5,689,384 A | 11/1997 | Albrecht et al. |
| 5,694,265 A * | 12/1997 | Kosugi et al. ............ 360/77.05 |
| 5,771,130 A | 6/1998 | Baker |
| 5,784,296 A * | 7/1998 | Baker et al. ................... 360/53 |
| 5,831,787 A * | 11/1998 | Yoshida et al. .......... 360/78.14 |
| 5,991,104 A | 11/1999 | Bonyhard |
| 6,064,541 A | 5/2000 | Sasamoto et al. |
| 6,075,667 A | 6/2000 | Kisaka et al. |
| 6,104,568 A | 8/2000 | Drouin et al. |
| 6,172,836 B1 | 1/2001 | Bang |
| 6,212,023 B1 | 4/2001 | Bonyhard |
| 6,219,197 B1 * | 4/2001 | Brown et al. ............ 360/77.08 |
| 6,259,576 B1 | 7/2001 | Ahn |
| 6,262,861 B1 * | 7/2001 | Kosugi ..................... 360/78.14 |
| 6,304,407 B1 * | 10/2001 | Baker et al. ................... 360/75 |
| 6,324,032 B1 * | 11/2001 | Ohtsuka et al. ............. 360/135 |
| 6,426,844 B1 * | 7/2002 | Anderson et al. ........ 360/77.08 |
| 6,522,488 B2 * | 2/2003 | Sasamoto et al. ........ 360/77.08 |
| 6,529,341 B1 * | 3/2003 | Ishida et al. ............. 360/77.08 |
| 6,704,156 B1 * | 3/2004 | Baker et al. ................... 360/75 |
| 6,738,205 B1 * | 5/2004 | Moran et al. .................. 360/75 |
| 6,754,016 B2 * | 6/2004 | Messner et al. ......... 360/77.06 |
| 6,781,778 B1 * | 8/2004 | Molstad et al. .......... 360/77.01 |

FOREIGN PATENT DOCUMENTS

| | | | |
|---|---|---|---|
| JP | 2000-123506 | * | 4/2000 |
| WO | WO 99/24971 | | 5/1999 |

OTHER PUBLICATIONS

"Disk File Phase-Encoded Sector Servo Pattern With Data and Reference Fields In Each Sector," Jan. 1987, IBM TDB vol. 29, No. 8, pp. 3697-3699.*

(Continued)

Primary Examiner—David Hudspeth
Assistant Examiner—James L Habermehl
(74) Attorney, Agent, or Firm—Tejpal S. Hansra

(57) ABSTRACT

A hybrid servo pattern, which is printed onto a disk, for use in a disk drive. The hybrid servo pattern is used to position a head relative to the disk. In one embodiment, the hybrid servo pattern includes gray code and chevrons. The gray code provides coarse positioning information, and the chevrons provide fine positioning information.

110 Claims, 5 Drawing Sheets

OTHER PUBLICATIONS

Printed Media Technology for an Effective and Inexpensive Servo Track Writing of HDDs; Tatsuaki Ishida, Keizo Miyata, Talzo Hamada, and Kiyokazu Tohma—8th Joint MMM-Intermag conference, HC-07, Jan. 2001.

Demodulation of Servo Tracking Signals Printed With A Lithographically Patterned Master Disk; Tatsuaki Ishida, Keizo Miyata, Nobuyuki Komura, and Tetsurou Takaoka, 8th Joint MMM-Intermag Conference, BE-09, Jan. 2001.

* cited by examiner

DOWN TRACK OR TIME OR ANGLE

HYBRID PRINTED SERVO PATTERNS FOR MAGNETIC MEDIA AND HARD DISK SYSTEMS IMPLEMENTING SAME

CROSS-REFERENCE TO RELATED APPLICATIONS

This is a continuation-in-part of U.S. patent application Ser. No. 10/060,914, filed Jan. 29, 2002, which claims priority from U.S. Provisional Application No. 60/273,561, filed Mar. 6, 2001, both of which are incorporated herein by reference in their entireties.

BACKGROUND OF THE INVENTION

1. Field of the Invention

The present invention relates to disk drives. More particularly, the present invention relates to a servo pattern which is printed on a disk of a disk drive. Even more specifically, the present invention relates to a hybrid servo pattern, including gray code and chevrons, both of which are printed on a disk of a disk drive, and to a method of positioning a head relative to the disk by reading the hybrid servo pattern.

2. Relevant Background

Disk drives that magnetically record, store, and retrieve information on disk-shaped storage media, i.e., disks, are widely used in the computer industry. A magnetic head includes a write transducer and a read transducer. The write transducer is used to record information on the disk, and the read transducer is used to retrieve information from the disk. A magnetic head assembly includes the head and an air bearing slider that suspends the magnetic head assembly relative to the rotating disk by "flying" on a small cushion of air proximate to the disk surface when a spindle supporting the disk is rapidly rotated.

The magnetic head assembly is mounted on the end of an actuator arm that is moved by a voice coil motor to position the head radially relative to the disk surface. The head reads data from and writes data to generally concentric tracks located on the disk surface. Each concentric track has a unique radius, and reading and writing information to or from a specific track requires the head to be located above the track. By moving the actuator arm, the head is moved radially relative to the disk surface across various tracks.

Disk drives typically use embedded servo sectors of magnetically recorded information which are stored on the disk surface. The servo sectors are read by the head to inform the disk drive of track location. Each track typically includes both servo sectors and data sectors, and the servo sectors are interspersed between the data sectors. Each data sector contains a header followed by a data section. The header may include synchronization information to synchronize various timers in the disk drive to the speed of disk rotation, while the data section is used for recording user data.

Each servo sector (or servo pattern therein) typically includes gray code and several servo bursts. The gray code is a binary code that indexes the radial position of the track such as through a track number and, in some instances, might also include a circumferential index such as a sector number. The servo bursts provide positioning information for the actuator arm and may be a centering pattern that allows positioning the head over the center of the track. By comparing portions of the servo burst signals, the disk drive can iteratively adjust the head location by operating the voice coil motor until a zeroed position error signal is returned from the servo bursts indicating the head is properly centered with respect to the track.

Servo patterns are usually written on the disk using the head. Accordingly, the servo patterns are usually written after the disk drive has become partially operational. The servo patterns, and particularly the track spacing and centering information, need to be precisely located on the disk. However, at the time the servo patterns are written, there are no reference locations on the disk surface which can be perceived by the disk drive.

Typically, a specialized device known as a servowriter (or servo track writer) is used in conjunction with the head when writing servo patterns. Traditional servowriters require two holes in the disk drive. One hole is for receiving a push-pin, which is used in combination with an encoder to guide the actuator arm so that the head is positioned at desired (and precise) radial locations across the disk surface. The other hole is for receiving a clock head, which is used to both write, and repeatedly read, timing information so that servo patterns are written at precise circumferential locations and are aligned in the circumferential direction on all tracks. Since both the radial position and the circumferential position of the head relative to the disk surface are known, it is possible to write servo patterns at precise locations onto the disk surface. Once written, servo patterns serve as positional references on the disk surface for the disk drive's entire life.

Because of the holes required for the servowriter, the servowriter operations must be done in a clean room in order to prevent contamination of the disk drive. However, clean rooms, especially those large enough to accommodate tens of servowriters, are expensive to build and maintain. Furthermore, it is difficult to maintain and operate a servowriter in a clean room. In addition, largely because of the locational precision needed, servowriters are fairly expensive, and servowriting is a time-consuming process that adds to disk drive production costs. Often, the servowriter is the highest-priced device used in the construction of the disk drive, and servowriting is a manufacturing bottleneck.

Servo patterns are conventionally written by moving the head from one radial location to a next radial location until servo patterns have been written across substantially the entire disk surface. That is, the head is positioned at a first radial location and servo patterns are written at that radial location. Subsequently, the head is moved to a next radial location and servo patterns are written at that radial location. This process repeats until servo patterns have been written across substantially the entire disk surface.

As the number of tracks per inch increases, the number of radial positions where servo patterns are to be written increases. In turn, the amount of time that the servowriter requires to write servo patterns increases, thereby exacerbating the bottleneck associated with servowriting. Hence, the data storage industry has begun to search for alternatives to existing servowriting techniques.

Attempts have been made to produce reference disks for servowriting or even disks that eliminate the need for servowriters. These disks have been fabricated using a variety of magnetic and other printing methods that transfer a servo pattern directly to the disk surface prior to insertion of the disk in the disk drive. Some of these printed patterns are narrow rectangular elements and spaces. The resolution of these printing methods has been much lower than that currently achievable with servowriters. Contemporary servo patterns have transition densities of about one eighth micron; however, the transition densities between the narrow rectangular elements and spaces of printed servo patterns are about four to eight times larger. Further, the ends of the narrow rectangular elements have blunted corners which cause the ends to be nearly semi-circular. Such printed servo patterns have blunted corners due to diffusion, diffraction, and other phenomena occurring in the manufacturing processes, and appear as if they had been written by a fat write head with eroded poles. As a result, the disk drive's servo position accuracy is reduced due to fine defects at the conventional ends (or edges) of the servo pattern in such pre-patterned disks.

Pre-printed patterns have been produced with narrow rectangular elements, without gray code. One such pattern is described in U.S. Pat. No. 6,304,407 entitled "Self-Writing of Servo Patterns Based on Printed Reference Pattern in Rotating Disk Drive", which is incorporated by reference herein in its entirety. U.S. Pat. No. 6,304,407 describes printed reference features (such as inclined, slender rectangular elements) to convert accurate timing measurements into accurate radial position information. This radial position information, along with circumferential timing information from the printed pattern, corresponds to similar data provided by a conventional servowriter; however, it is available when the disk drive is sealed and removed from the costly clean room. Therefore, the control system and other electronics can be assembled to complete the disk drive, and it can be placed on a test rack in a less costly environment. Subsequently, the control system software can write a new, final servo pattern.

While such patterns have proven useful for self-servowriting of disk drives, such patterns have limitations. For example, such patterns can only identify small changes in the radial position of the head relative to the disk surface. Specifically, because discrete Fourier transform measurements provide sine and cosine values from data in a sampling window, a change of one full cycle (360 degrees) gives the same values of the sine and cosine. (Laser interferometers and optical encoders have the same sine and cosine outputs, and the position is only determined within one cycle of 360 degrees.) Therefore, in order to use such patterns, the head motion must be restricted so that more than two samples are made within every 360 degree cycle. Accordingly, the head velocity must be limited so that the sampling rate is not overrun. Hence, high-speed seek operations cannot be performed using such patterns directly. Instead, such patterns are used to write more traditional final servo patterns, with which high-speed seek operations can be performed.

Another limitation of the printed reference patterns described in U.S. Pat. No. 6,304,407 is that such patterns do not provide absolute position information. Rather, such patterns form part of an incremental system which is capable of providing the radial position of the head relative to the disk surface within a 360 degree cycle. Accordingly, if such patterns are used for self-servowriting and if the self-servowriting is interrupted, the head cannot return to the location where the last self-servowritten pattern was written. Instead, the head must return to a known position location (e.g., the crash stop) and creep-in towards the center of the disk in order to complete the self-servowriting. Thus, duplicative efforts may be required to complete the self-servowriting.

Conventional servo patterns include gray code (with one code or numerical value per track) to provide absolute indication of radial position. At any radius, the gray code can be read to provide an approximate track number. However, the gray code is ambiguous at the track boundaries, so ambiguities exist at the track boundaries. The ambiguities in the gray code are no more than one value of the gray code. Conventional servo patterns resolve such ambiguities by comparing the amplitudes of special frequency burst segments (i.e., servo bursts) which are written in each servo sector and positioned off the center of the track. By comparing amplitudes of two or more of the burst segments in a servo sector, it is possible to combine gray code and burst amplitude information to resolve ambiguities in the gray code and, hence, provide absolute position information for any radial position. However, as tracks continue to be made narrower, the ambiguities (or fuzziness due to edge of burst errors) become larger relative to the track width.

Hence, there remains a need for an improved method for producing a printed servo pattern on a disk surface to enable accurate positioning of the head within a disk drive. Such an improved method would preferably be readily reproducible within a manufacturing setting, such as a storage media production facility, while reducing manufacturing time and cost.

SUMMARY OF THE INVENTION

The present invention provides a hybrid servo pattern on a disk that addresses limitations and problems of traditional servowriting. The hybrid servo pattern provides absolute positioning that can be used for self-servowriting or as a final servo pattern. In printed servo patterns, the end effects (i.e., poorly defined corners of the narrow rectangular printed elements) typically do not extend more than a half element width from the corners, which results in relatively clean, straight edges along the remainder of the printed edges of the narrow rectangular servo elements. The present invention provides a disk with a hybrid servo pattern including gray code and chevrons. The gray code provides coarse positioning information, and the chevrons provide fine positioning information. The hybrid servo pattern may be produced by a variety of printing methods such as direct magnetic transfer, magnetic printing using a master pattern of high permeability and low coercivity placed in contact with a slave surface, magneto optics, and other known magnetic media printing methods.

Advantageously, when self-servowriting has been interrupted, this unique combination of gray code with chevrons allows the head to return to the location where the last self-servowritten pattern was written. Thus, the self-servowriting may be more efficient.

Furthermore, the unique combination of gray code and chevrons may be used as a final servo pattern by the disk drive, without self-servowriting. Accordingly, manufacturing time may be reduced, especially as printing methods and technology are improved to facilitate printing the hybrid servo pattern (gray code and chevrons) with decreased feature size so it occupies less of the disk surface, such as less than about 13 percent and more preferably less than about 8 percent of the disk surface.

Once assembled with a disk fabricated with the hybrid servo pattern, the disk drive is configured with a servo signal demodulator, a position controller, operating code in a microprocessor, and other components to read the gray code using conventional techniques and to demodulate the signal from the chevrons using discrete Fourier transforms or other techniques to obtain fine position information. Burst sample windows are selected to sample the interior clean portion of the chevrons adjacent to the fuzzy or noisy end portions of the gray code. The careful combination of the geometrical elements in the hybrid servo pattern enables the disk drive to position the head to effectively perform fast seeks to the neighborhood of an absolute radius based on the gray code.

The head positioning continues with a highly accurate settle-to-track sequence using the fine position information obtained, such as by phase indications, from the chevrons in the burst sample windows.

The invention provides a method of printing a servo pattern for positioning a head relative to a disk in a disk drive. The method includes recording sync and AGC fields and then a servo address mark (SAM) providing a sync signal to read a following gray code. The gray code contains first linear elements that provide the approximate radius on the disk. The hybrid servo pattern is a hybrid pattern due to recording fine position information in second linear elements, inclined relative to the first linear elements. The fine position information is measured by determining the difference in time it takes either from a sync mark(s) to an inclined second linear element or from pairs of oppositely inclined second linear elements.

The second linear elements are usually arranged as chevrons and are preferably recorded in a pattern of nested chevrons such that pairs of the second linear elements are arranged as spaced legs or sides of a V-pattern and a distance between a first side and a second side of each chevron provides an indication of relative radial position. The unique pattern also provides a periodic signal when read by the disk drive. The periodic signal enables later phase resolution by the disk drive to recover the fine position information. The recording steps may include a number of different printing methods including optical printing, magneto optical laser-assisted writing, contact printing, transfer from a high permeability master pattern, cobalt master printing, ion processing, and others known in the field of magnetic media production.

According to another aspect of the invention, a disk drive includes a disk for storing and retrieving information (such as a disk made by the printing methods of the invention). The disk includes a hybrid servo pattern that is printed and embedded in its servo sectors. The hybrid servo pattern is a combination of gray code providing coarse position information and fine phase-derived position information enabling accurate head alignment in settle-to-track head positioning. The disk drive further includes a head for reading information, such as the gray code and the fine position information, from the disk surface. The disk drive further includes a servo signal demodulator for receiving the read information from the head and recovering the fine position information from the read information. Each pair of inclined linear elements preferably is arranged as spaced legs of a V-pattern with pairs stacked such that, during read operations, the head reads the information as a periodic signal. The servo signal demodulator demodulates the periodic signal from the inclined linear elements to recover the fine position information, such as by using a discrete Fourier transform. The servo signal demodulator may set burst sample windows to sample only interior portions of the inclined linear elements, thereby avoiding noisy end portions. The disk drive further includes a processor for combining the gray code from the read information with the fine position information from the read information, and for using the combined information to issue a servo position command signal. The disk drive further includes a servo control for receiving the servo position command signal and, in response, issuing an input command signal to a head positioner to align the head over a particular radial location (e.g., a track).

DETAILED DESCRIPTION OF THE PREFERRED EMBODIMENTS

The present invention is directed to a hybrid servo pattern on a magnetic disk, to a hard disk drive using such a disk, and to a method of positioning a read/write head based on information read from the hybrid servo pattern. The following description begins with a description of an exemplary hard disk drive (HDD) configured to use a disk having a hybrid servo pattern according to the invention with reference to FIGS. 1–3. Then, with reference to FIGS. 1–8, a detailed description of the hybrid servo pattern is provided, along with a discussion of fabrication procedures and the operation of the HDD to properly read the hybrid servo pattern to position the head.

Figure 1:
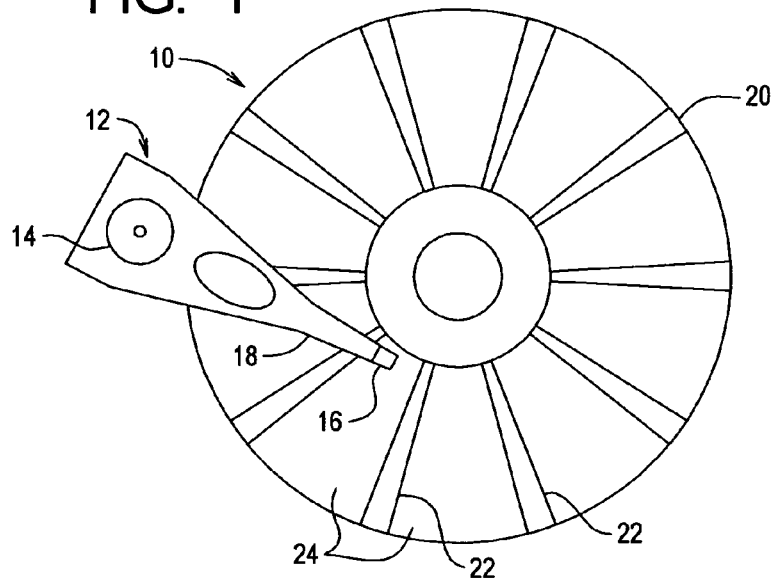
FIG. 1 is a simplified diagrammatic representation of a magnetic hard disk drive according to the invention with an actuator assembly positioning a read/write head relative to a magnetic disk with alternating servo and data sectors.

Referring to FIG. 1, a simplified diagrammatic representation of a portion of hard disk drive 10 is provided. FIG. 1 illustrates a top view of one surface (or platter) of magnetic disk (or disks) 20 fabricated according to the invention. Disk drive 10 includes actuator assembly 12 with pivoting actuator 14 that positions read/write head 16 by positioning or moving actuator arm 18 relative to tracks (not shown) on disk 20. Often, actuator 14 is a current-driven voice coil motor (VCM).

The track position data read or obtained by head 16 is contained in specific areas of disk 20 called servo sectors 22. (It should be noted that servo sectors 22 are shown in linear rather than arcuate shape for ease of understanding.) Disk 20 further includes data sectors 24 in which data is read from and written to disk 20. Sectors 22, 24 are coherent, so during operation of disk drive 10, the timing between each sector around the circumference of disk 20 is maintained from the inner diameter of disk 20 to the outer diameter of disk 20.

There are typically fifty to two hundred or more equally spaced (e.g., in time or angle) servo sectors 22 on the surface of disk 20. The position data in servo sectors 22 includes standard positional information including preamble information, a servo address mark (SAM) for precisely marking the start of a sequence of signal components including index information, sector number, gray code and servo bursts. The "hybrid" servo pattern replaces conventional servo bursts with inclined strips arranged as chevrons, which provide fine positional information and resolve ambiguity of the gray code at its transition points (as will be explained in detail with reference to FIGS. 3–8).

Figure 2:
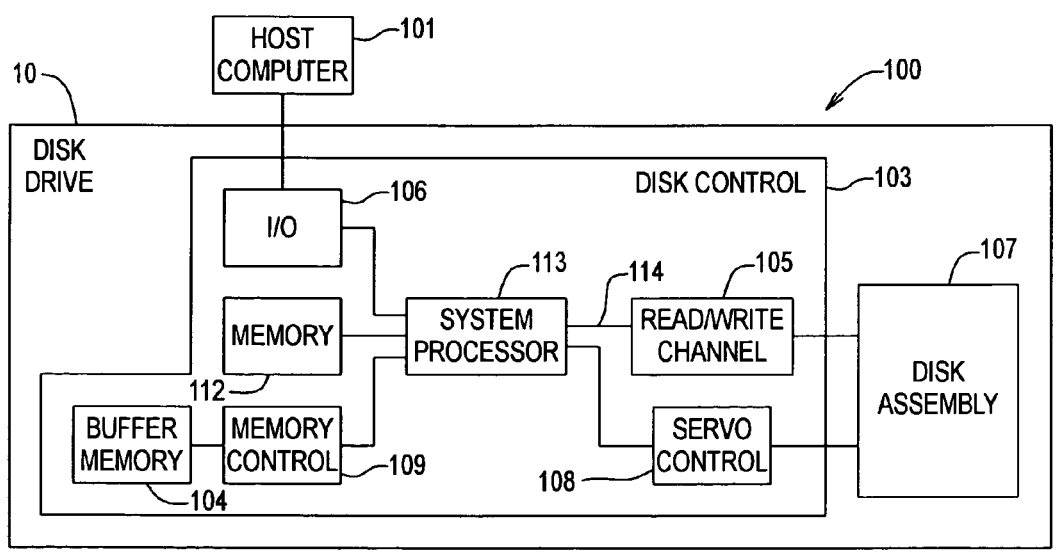
FIG. 2 is a block diagram illustrating a computer system that includes a host computer and the disk drive and uses a hybrid servo pattern of the invention in the servo sectors of FIG. 1 for enhanced position control.

FIG. 2 illustrates, in simplified form, computer system 100 in which the invention is embodied. Computer system 100 includes disk drive 10 and host computer 101. Disk drive 10 includes system processor 113 that processes requests and commands from host computer 101 that direct disk drive 10 to perform specific tasks involving disk assembly 107. Examples include reading and writing data to and from disk assembly 107 (such as in data sectors 24) and providing state information such as defect tables, error status and the like. Disk control 103 includes data processing capacity as well as memory 112 in the form of read only memory (ROM) or random access memory (RAM) and buffer memory 104 to store responses to received commands and requests. The responses return data, state information, and/or error codes depending on the particular operation being performed.

Disk assembly 107 implements physical mass storage typically on disk (or disks) 20, and read/write electronics for transferring data with disk 20. Disk assembly 107 typically includes read channel hardware for preprocessing and amplifying data read from disk 20 as well as a spin motor for spinning disk 20 and a voice coil motor (VCM) for positioning head 16 at specific locations with respect to the surface of disk 20 based on the position information read or recovered from the hybrid servo pattern in each servo sector of the surface of disk 20.

Servo control 108 generates drive signals that control the VCM and/or spin motor. These drive signals are precision voltage or current signals that drive the motors directly. For example, servo control 108 may include a driver and supply drive signals using a power drive circuit, but the operation of the invention does not depend on how the VCM is driven. The VCM is usually driven by a transconductance amplifier but could also be voltage driven or driven with many other suitable methods. As it has no bearing on the validity of the invention, the type of driver may be varied in practicing the invention and the drivers described do not limit the invention.

Host computer 101 typically comprises a data processing device such as a personal computer, server, workstation or the like that requires access to the bulk data storage capabilities of disk assembly 107. Host computer 101 sends write commands and data via disk control 103 to write data onto disk 20 as well as read commands to retrieve previously written data from disk 20. For both read and write operations, the data transmitted from host computer 101 to disk control 103 includes a specific location or set of locations in disk assembly 107 that contains the data to be accessed. Disk assembly 107 can also serve as a computer with host computer 101 acting as an interface to facilitate servowriting.

The data exchanged through disk control 103 is typically buffered in buffer memory 104 that is accessible via memory control 109 and subsequently transmitted to disk assembly 107 or host computer 101. Buffer memory 104 overcomes differences between the speed at which host computer 101 operates compared to the speed at which disk assembly 107 operates. In place of or in addition to buffer memory 104, a cache memory may be implemented by appropriate changes (e.g., tag management, hit/miss detection and the like) to memory control 109.

Figure 3:
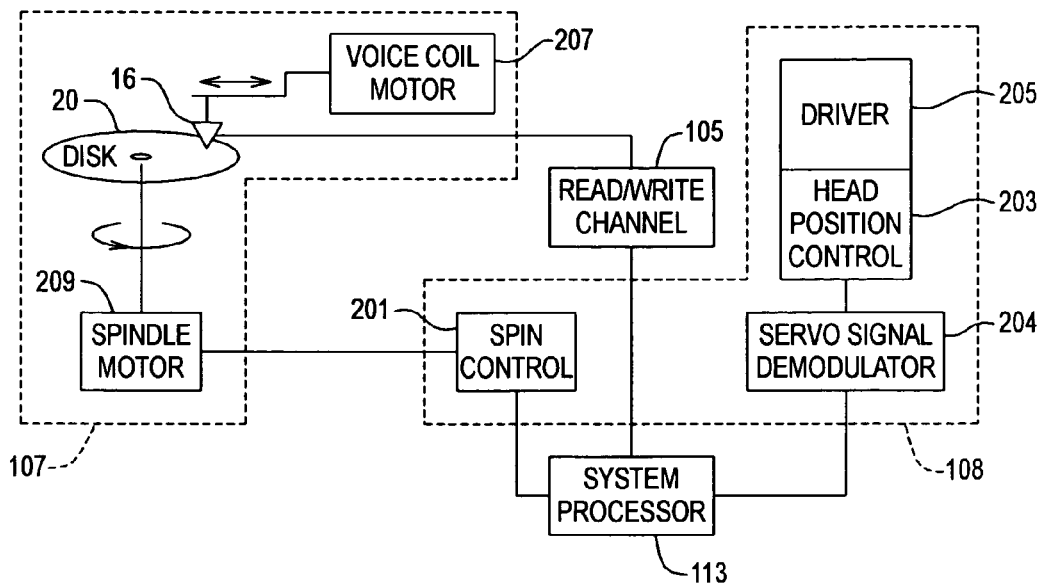
FIG. 3 is a block diagram illustrating more details of portions of the disk drive including a position control system to position the head relative to the disk using a servo signal demodulator.

FIG. 3 illustrates components of FIG. 2 in greater detail. Servo control 108 includes spin control 201 that regulates the spin speed of spindle motor 209 in response to commands from system processor 113. Head position control 203 operates through driver 205 to deliver input command signals in response to commands from system processor 113 to a head positioner provided by voice coil motor (VCM) 207 to position head 16 relative to disk 20. These input command signals cause VCM 207 to move or position head 16 with respect to the surface of disk 20. VCM 207 controls actuator assembly 12 to position head 16.

Channel 105 communicates data and position control information, i.e., signals, read from or written to the surface of disk 20. Position control information is contained within the hybrid servo pattern encoded or printed in servo sectors 22. The data and position control information is provided through channel 105 to system processor 113. The printed hybrid servo pattern is especially well-suited for channel 105. Channel 105 converts the analog signal from head 16 into digital signals (or vice versa). Channel 105 may be used in reading and writing to and from both servo sectors 22 and data sectors 24.

System processor 113 communicates with servo signal demodulator 204 (e.g., a digital signal processor) which demodulates the signals from the chevrons in burst sample windows to recover fine position information, as will be discussed in detail with reference to FIGS. 4–6. Servo signal demodulator 204 may take many forms, such as the channel chip described in U.S. Pat. No. 5,784,296 to Baker et al. which is incorporated by reference herein in its entirety or the MS453B Napa chip available from Lucent Technologies, Inc., to obtain fine position information from the burst sample window signals and may be located anywhere within disk drive 10 in communication with system processor 113. Channel 105, servo signal demodulator 204 and other components function independently or in combination with the servo and/or internal clock (not shown) in timing and performing preamble detection, bit-pair synchronization, gray code detection, SAM detection, amplitude detection, and control and output formatting. System processor 113 also reads position control information, including gray code, to obtain radial position information. System processor 113 uses this information to compute commands for spin control 201 and head position control 203. Dependent on the admittance function of the load, the computed commands will not result in ideal reactions, hence, the computed commands are modified by head position control 203 and/or driver 205 to compensate for variations in the current/voltage relationship caused load impedance.

The above discussion provides a general understanding of the operation of disk drive 10 and the need for obtaining fine position information for accurate positioning of head 16 with VCM 207. The following discussion provides a preferred hybrid servo pattern, printing methods for fabricating disks with the hybrid servo pattern, and operations of disk drive 10 and servo control 108 to read the hybrid servo pattern.

The hybrid servo pattern is printed onto servo sectors 22 prior to placing disk 20 within disk drive 10. Printing the hybrid servo pattern lowers fabrication costs and reduces processing time by eliminating the need for servowriters and/or clean room fabricating facility space associated with servowriters, and increases accuracy by reducing error sources from external sensors and pushers, clock flutter, suspension flutter, disk flap, and spindle wobble that may occur with servowriters.

Figure 4:
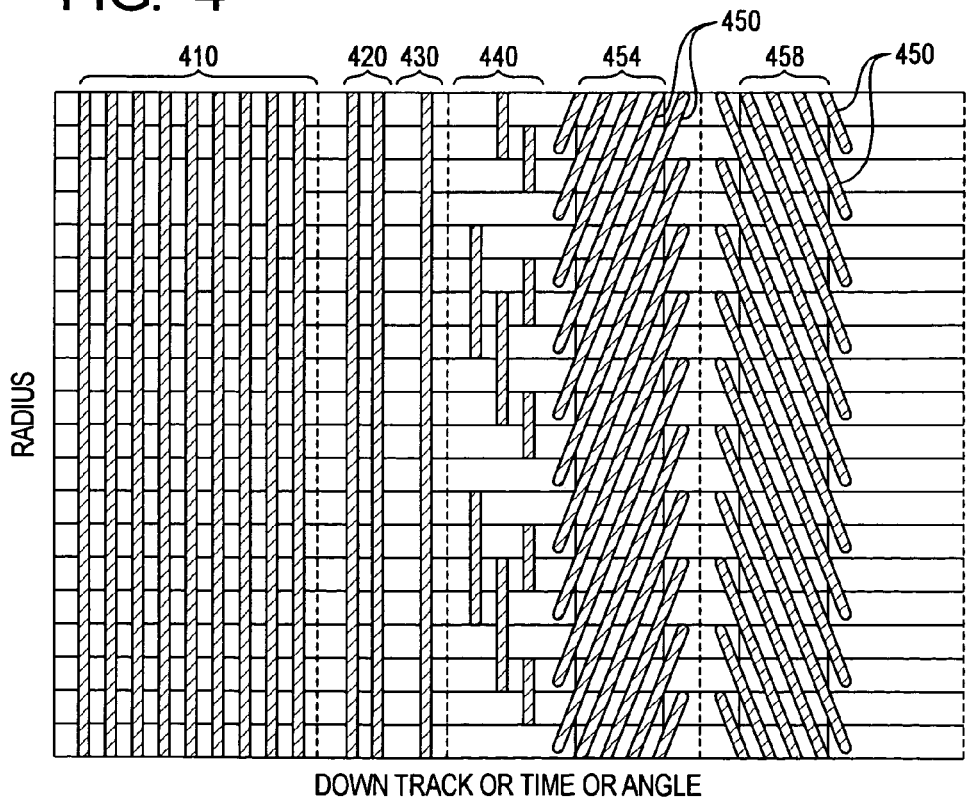
FIG. 4 is a simplified logical diagram of the hybrid servo pattern in the servo sectors illustrating the combined use of gray code with chevrons and the use of burst sample windows in the interior clean portion of the chevrons.

FIG. 4 is a logical diagram of representative features of a hybrid servo pattern of the invention that is printed within each servo sector 22 of disk 20. The vertical axis is proportional to the radius on disk 20 and the horizontal axis represents time or angle of rotation of disk 20. The hybrid servo pattern includes preamble information 410, servo address marks 420, index information 430, and gray code 440 that are substantially vertical strips or lines within which magnetization is reversed relative to the adjacent portions of the disk surface.

Figure 5:
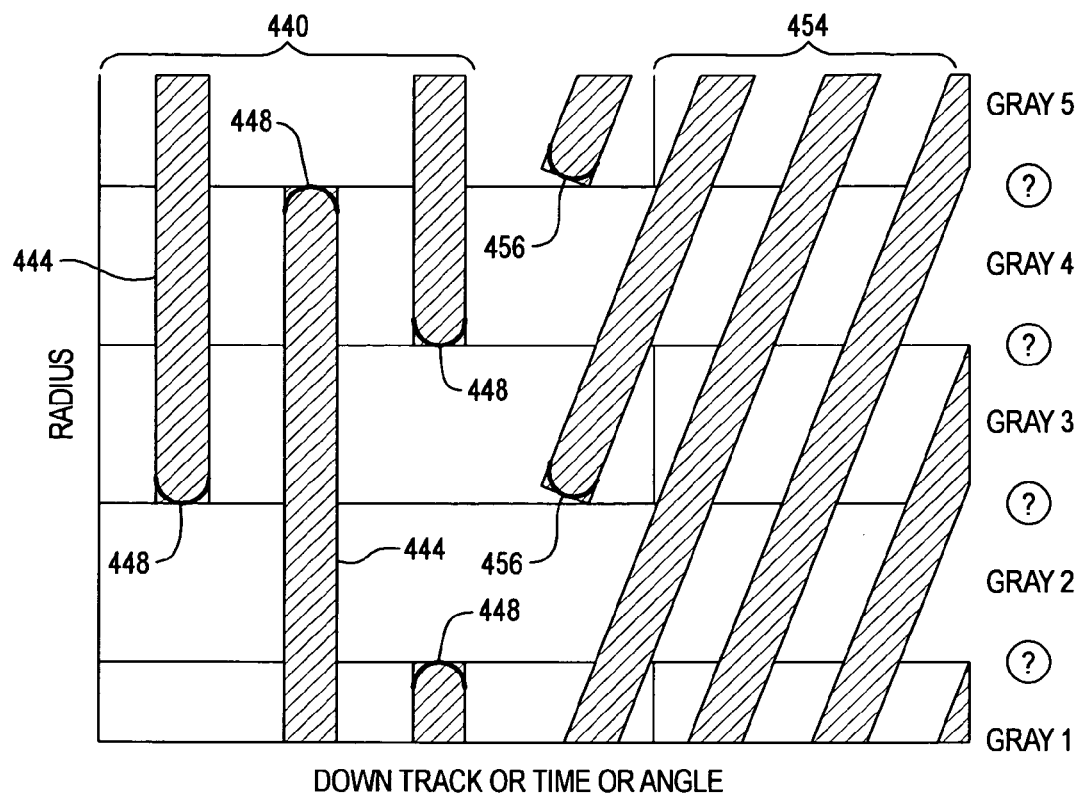
FIG. 5 is an enlarged partial view taken from FIG. 4 further illustrating the use of the clean portions of the chevrons to obtain fine position information at "fuzzy" ends of gray code.

As shown more clearly in FIG. 5, gray code 440 includes vertical bar-like linear gray code elements 444 with ends 448 where gray code 440 changes. Due to diffusion, diffraction, and other phenomena occurring during printing operations, ends 448 are "fuzzy" and typically provide noisy signals making ends 448 difficult to decode by system processor 113. However, gray code elements 444 are useful in high-speed seeks for identifying the approximate radius to a cycle number, e.g., to an accuracy of plus or minus one unit, even though portions are often not clearly read. During printing, ends 448 are purposely offset so that adjacent chevrons 450 can help determine absolute radial position by providing fine position information.

To overcome the ambiguity caused by ends 448, the hybrid servo pattern includes chevrons 450. Chevrons 450 are inclined bar-like linear fine position elements that provide fine position information. Chevrons 450 have relatively straight elongated edges that continuously extend radially and circumferentially relative to disk 20. Chevrons 450 include ends 456 which (like ends 448) are fuzzy due to diffusion, diffraction, and other phenomena occurring during printing operations and typically provide noisy signals making ends 456 difficult to decode by system processor 113. Chevrons 450 are arranged as at least one phase-to-position group. Preferably, chevrons 450 are arranged as two groups of spaced legs in a V-pattern (as illustrated in FIG. 4). Two or more chevrons 450 may provide fine position information and/or compensate for minor errors in the clock circuit.

Figure 5A:
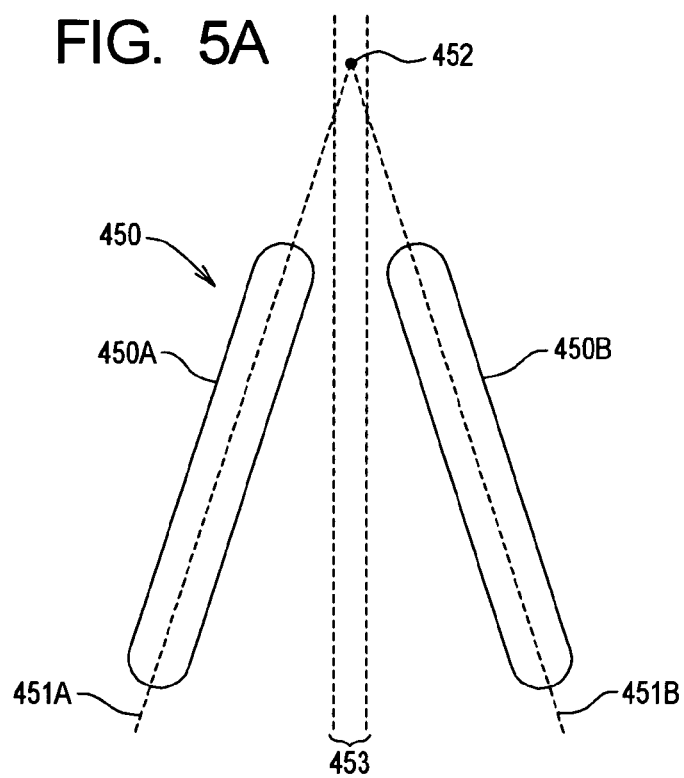
FIG. 5A is an enlarged partial view taken from FIG. 4 further illustrating the use of oppositely inclined linear elements of the chevrons arranged as spaced legs of a V-pattern.

As shown more clearly in FIG. 5A, each chevron 450 is a nested pair of oppositely inclined linear elements 450A, 450B arranged as spaced legs of a V-pattern without a vertex. Imaginary lines 451A, 4511B are co-extensive with and extend from linear elements 450A, 450B, respectively, and intersect with one another at vertex 452 of the V-pattern. However, linear elements 450A, 450B are spaced from vertex 452, and no servo information is located at vertex 452. In addition, continuous radial strip 453 of disk 20 overlaps vertex 452, circumferentially extends between and is spaced from linear elements 450A, 450B, radially extends beyond linear elements 450A, 450B towards the inner and outer diameters of disk 20 and contains no servo information.

Referring again to FIG. 4, chevrons 450 are inclined strips with magnetization reversed relative to the adjacent background disk surface. Chevrons 450 provide fine position information that is particularly useful in settle-to-track sequences for positioning head 16 relative to the desired radius. More specifically, the signals from chevrons 450 are used by an internal clock that keeps track of time or timing. When head 16 is on track, the internal clock measures the change in time (typically by Fourier transforms). In other words, the radial displacement can be computed from timing differences measured between SAM 420 and chevrons 450 in burst sample windows 454, 458. Alternatively, timing differences may be measured between pairs of chevrons 450 in burst sample windows 454, 458. A convenient method is based on DFTs measured by servo signal demodulator 204 (see, for example, U.S. Pat. No. 5,784,296 to Baker et al.). The sensitivity is doubled by measuring timing (e.g., phase angles) of two oppositely inclined groups of chevrons 450 and computing the difference.

Burst sample windows 454 and 458 are carefully set such that ends 456 (see FIG. 5) of chevrons 450 are masked out and not included within burst sample windows 454, 458 (see FIG. 4) and thus not sampled for demodulation. Further, ends 448 of gray code elements 444 are fuzzy and the gray value may be decoded incorrectly. These ambiguous radii (shown at the solid horizontal lines in FIG. 5) are flagged or marked with question marks as shown on the right side of FIG. 5. In a preferred embodiment, gray code elements 444 change at radial displacement intervals equal to about the slant height of a line or space of chevrons 450 (e.g., the solid horizontal lines in FIG. 5 are spaced at this slant height). These ambiguous radii are supplemented with position information from the clean area of the adjacent chevrons 450 sampled from burst sample windows 454, 458. In this manner, gray code 440 is resolved and disk drive 10 recovers higher resolution position information for head 16 position operations.

Figure 6:
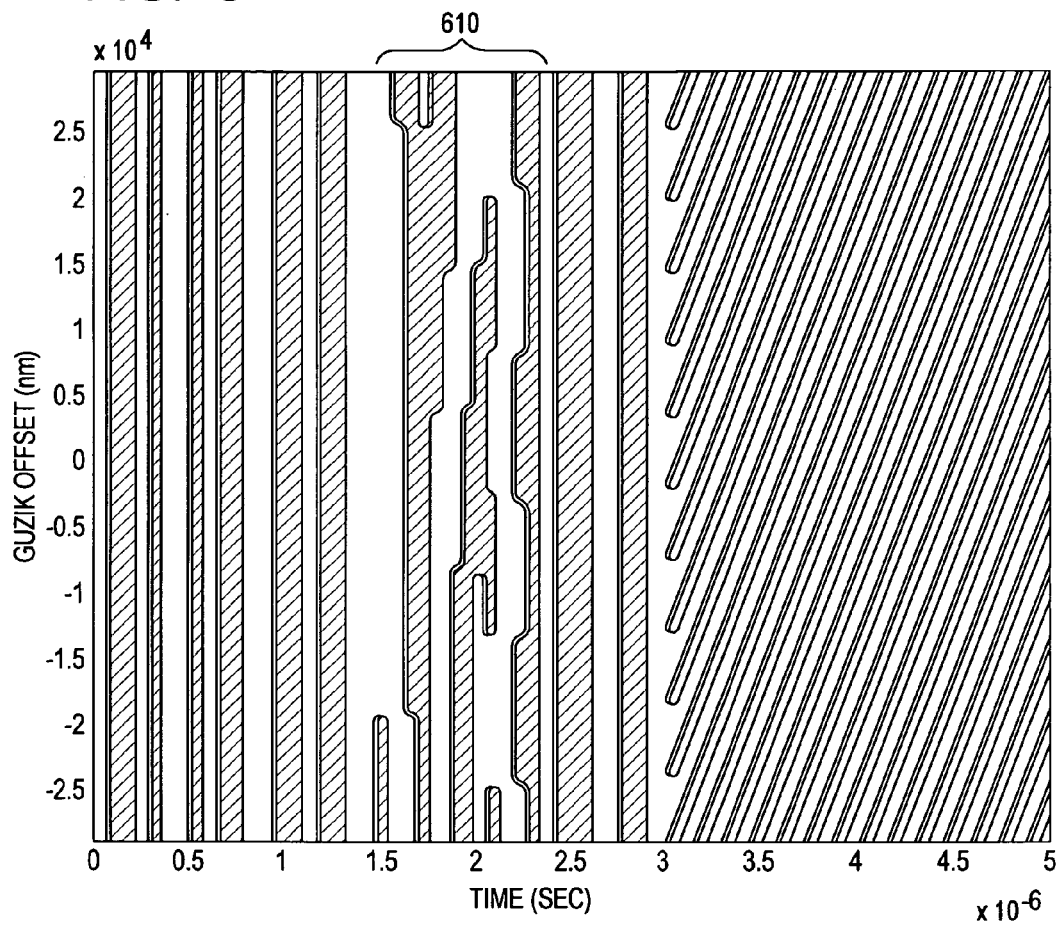
FIG. 6 illustrates a magnetic image of a portion of the disk printed according to the invention illustrating round edges of the gray code elements due to printing, which according to the invention, are compensated for using adjacent chevrons.

FIG. 6 is a reproduced magnetic image of a portion of a printed disk on a spin stand that was fabricated with a hybrid servo pattern according to the invention. The portion 610 of the gray code in which transitions occur may result in ambiguous pulses when the disk is read. These ambiguities in the gray code are resolved by identifying phases of the chevrons sampled in burst sample windows 454, 458. FIG. 6 illustrates transitions of two gray code bits in portion 610, and each gray code bit extends in the radial direction for about one cycle of the chevrons. This is an exemplary pattern and may readily be modified to practice the invention. In other embodiments, the hybrid servo pattern could be constructed with two gray code bits per chevron cycle, with one gray code bit per every two chevron cycles, and so on.

Referring again to FIGS. 4 and 5, ends 448 of gray code 440 (and its corresponding noise effects) do not extend more than about a half of the width of a gray code element 444 and have relatively clean, straight edges along the remainder of gray code elements 444. The timing elements (preamble information 410, SAM 420 and index information 430) extend from the inner diameter of disk 20 to the outer diameter of disk 20 along isochrones that are oriented roughly in the radial direction.

Figure 7:
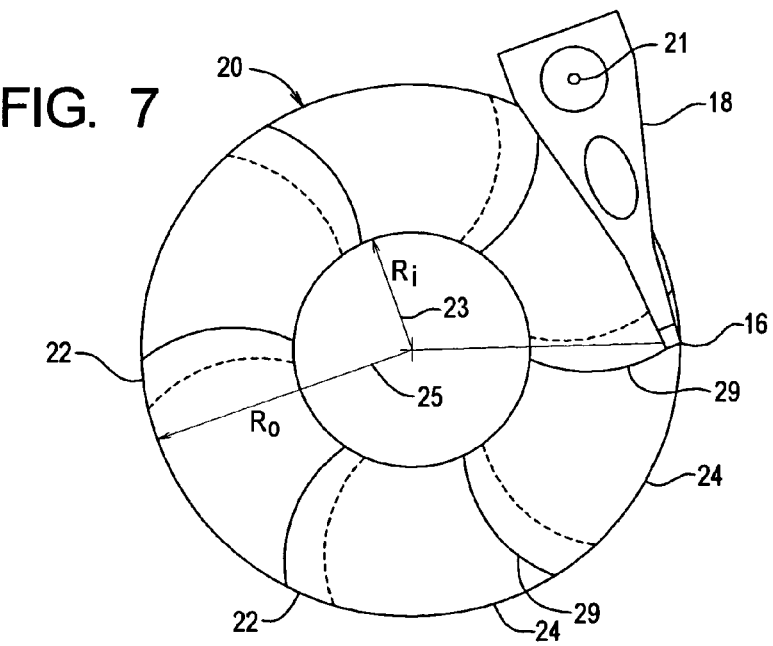
FIG. 7 is a simplified view of the disk drive illustrating isochrones through which the head may be positioned.

FIG. 7 illustrates, in simplified fashion, the arrangement of isochrones 29 with rotary actuator 21. Isochrones 29 extend between the inner diameter (at inner radius $R_i$ 23) of disk 20 and the outer diameter (at outer radius $R_o$ 25) of disk 20. Isochrones 29 are curved in FIG. 7, but when they are drawn based on the coordinates of radius and time, they appear as vertical lines as shown in FIGS. 4 and 5. Position information is encoded in chevrons 450 with the longer edges of chevrons 450 inclined at angles, e.g., plus or minus 20 degrees, from a local isochrone 29. Stacking or nesting chevrons 450 is preferred to give an analog periodic signal that can be measured by servo signal demodulator 204 or other elements of disk drive 10 for recovering encoded fine position information (such as change in time measurements).

The hybrid servo pattern allows the disk to be fabricated separately within a media production facility, rather than in a clean room or with a servowriter within an assembled disk drive. The hybrid servo pattern may be used as a reference pattern to perform self-servowriting of the final servo pattern or may be used to provide the final servo pattern without an intermediate self-writing step. If self-servowriting is performed using the hybrid servo pattern, it may be done outside a clean room to reduce costs. Additionally, if the hybrid servo pattern is used as the final servo pattern, large numbers of disks manufactured by automated lines (e.g., 600 parts per hour or higher) may be available for immediate use, thereby significantly reducing the cost of producing disk drives while increasing, or at least maintaining, positioning accuracy.

Disks pre-patterned with the hybrid servo pattern in servo sectors or wedges may be manufactured or printed using a variety of printing methods. For example, well-known magneto optic methods using a variety of light sources, such as visible lasers and deep ultraviolet sources, may be used to record the hybrid servo pattern on surfaces of disks. Alternatively, contact printing methods may be employed to create disks according to the invention. A contact printing method useful with the invention is described in U.S. Pat. No. 5,991,104 to Bonyhard which is incorporated herein by reference in its entirety.

Another magnetic printing method uses a master pattern of high permeability and low coercivity (similar to conventional writer pole materials), which is placed in contact with a slave surface. For example, see Patent Cooperation Treaty Application PCT/JP98/04913 published May 20, 1999 and filed by Matsushita Electrical Industrial Co., LTD, which is incorporated herein by reference. The recording film of the slave surface is initially uniformly magnetized in one circumferential direction of the disk, e.g., clockwise, by a large gapped head driven by a permanent magnet or a DC electromagnet. The head may have a track width extending from the inner diameter to the outer diameter of a data zone of the disk. The head gap is typically on the order of one millimeter with a similar fly height or separation from the slave surface. The field produced at the recording layer of the slave surface is greater than its coercivity ($H_c$), so the DC erased state is easily established in the absence of the master pattern.

The master pattern is then placed in contact with the slave surface, and a new large head of opposite polarity is brought near the back surface of the master pattern, e.g., about one millimeter from the slave surface. Magnetic flux from this large head passes through the low reluctance segments of the master pattern, but the fringing field at each gap of the master pattern reverses the magnetization of the slave surface. Thousands of elements of the master pattern act like pole tips of conventional write transducers, and the slave surface of the disk can be recorded by one turn of the magnet relative to the disk and the master pattern. Those skilled in the art will appreciate that other printing methods, such as magneto optical laser-assisted writing and the like, may be successfully employed to effectively print or pre-pattern magnetic media with the hybrid servo pattern of the invention. Such other manufacturing methods are within the breadth of the invention.

Referring to FIGS. 2–5, the inclusion of disk 20 having the hybrid servo pattern allows disk drive 10 to accurately obtain servo position information from disk 20 by processing signals from the hybrid servo pattern and, in response, effectively position head 16 by controlling VCM 207. During operation of disk drive 10, signals from the hybrid servo pattern on disk 20 are read by head 16 and communicated to channel 105.

Channel 105 may read gray code 440 and standard servo information (i.e., preamble information 410, SAM 420, and index information 430) in any useful manner, such as conventional read techniques available with many read/write channel chips.

The position information (gray code and chevron burst signals from the hybrid servo pattern) is communicated to system processor 113 that responds by issuing control signals to head position control 203. Head position control 203 may further modify the received control signal through driver 205 to deliver input command signals to VCM 207 to move or position head 16 at a radial location on disk 20. The position information read from gray code 440 may have noisy transitions at ends 448 of gray code elements 444, but is useful for identifying the chevron cycle number, typically with an accuracy of plus or minus one unit. Thus, the gray code position information is used by servo control 108 and system processor 113 to quickly position head 16 with VCM 207 in a fast seek to the neighborhood of a desired absolute radius (e.g., within a chevron cycle or two of the desired chevron).

In the settle-to-track sequence of operation, fine tuning and high accuracy positioning is achieved with disk drive 10 by recovering fine position information encoded in chevrons 450 in the hybrid servo pattern and providing input command signals from driver 205 to VCM 207. Significantly, burst sample windows 454, 458 avoid sampling chevrons 450 at ends 456. In other words, burst sample windows 454, 458 only sample from the clean interior portion of chevrons 450. Gray code elements 444 may have unclear ends 448, but chevrons 450 are accurately read at the corresponding radius in the hybrid servo pattern to resolve any ambiguities in gray code position information. Chevrons 450 may be sampled everywhere but the phase angles vary cyclically with radius. Gray code 440 combined with chevron 450 phases resolves the cycle number.

The sampled signals from burst sample windows 454, 458 are read by head 16 and communicated to channel 105 and servo signal demodulator 204 (which may be an integral part of channel 105 or a separate component or circuit as shown). The fine position information is recovered by servo signal demodulator 204 and includes high resolution position information used by system processor 113 in the settle-to-track operation to provide command signals to head position control 203. By combining the relatively accurate gray code position information with the more accurate fine position information read from chevrons 450, disk drive 10 overcomes potential noise problems in ends 448 and 456 to accurately position head 16 relative to disk 20.

Chevrons 450 are printed phase elements which can be resolved by DFT phase measurement, or other measurements, to overcome ambiguities at transitions in gray code 440. The fine position information from chevrons 450 can be obtained using a number of techniques. In one embodiment, servo signal demodulator 204 demodulates the signals sampled in burst sample windows 454, 458 to obtain the information. More particularly, the position information is preferably encoded in the form of chevrons 450 with the longer edges inclined at angles of about plus or minus 20 degrees from a local isochrone 29, as shown in FIG. 7. Measurement of the time required to cross from one leg of the V of chevrons 450 to the other leg of the V of chevrons 450 gives the distance from the vertex or a relative radial position. The stacking or nesting arrangement of a long chain of pairs of chevrons 450 provides an analog periodic signal during read operations. The periodic signal can then be resolved by phase to obtain the fine position information.

The servo signal demodulator 204 may measure the periodic signal sampled from the chevrons 450 with discrete Fourier transforms (DFTs). The demodulation of chevrons 450 using DFTs is explained in U.S. Pat. No. 5,784,296 to Baker et al. This DFT-type demodulation can readily be implemented with presently manufactured and distributed channel chips, such as those available from Lucent Technologies. In this embodiment, sine and cosine components of the sampled signal are input to an interpolator similar to those used in many optical encoders. The DFT-type filters remove most of the noise of the magnetic pattern of chevrons 450 and provide solid position information for the final servo pattern and timing references when the hybrid servo pattern is used for self-writing the final servo pattern (which may be desirable to allow normal densities to be written rather than decreased densities that may be experienced when using the hybrid servo pattern as the final servo pattern).

Figure 8:
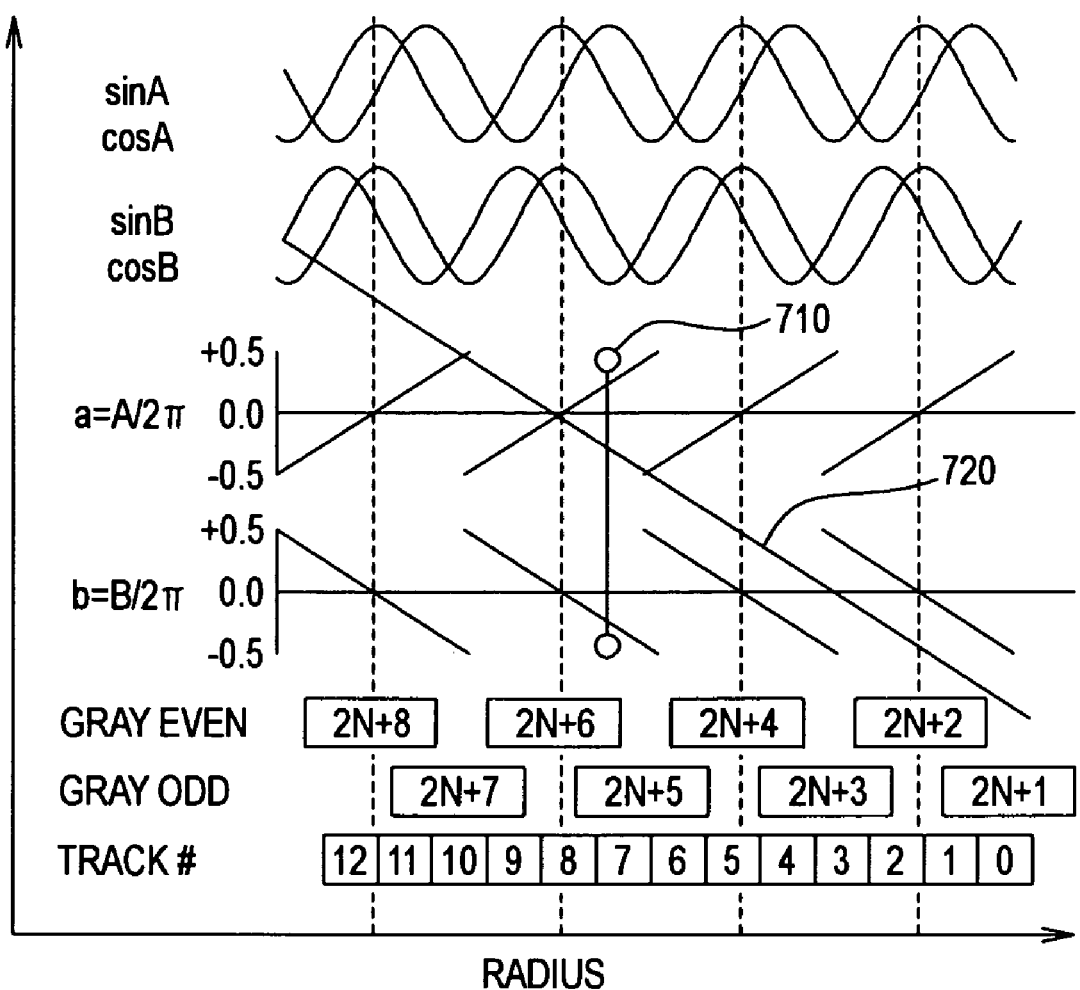
FIG. 8 is a graphical representation illustrating waveforms obtained by a read/write channel from the hybrid servo pattern as a function of disk radius and showing phase angles used to resolve a cycle to obtain accurate radial coordinates.

FIG. 8 further explains how the hybrid servo pattern enables ambiguity in gray code 440 to be accurately resolved. During operation, head 16 is scanned from left to right across the hybrid servo pattern shown in FIG. 5. The magnetization is directed in the same direction in the background areas (which were previously DC erased) while gray code elements 444 and chevrons 450 have reversed magnetization. As a result, the left edge of each gray code element 444 and chevron 450 is a magnetic transition that produces a read back pulse of the same polarity, e.g., positive. The right edge is also a magnetic transition that produces a read back pulse of opposite polarity, e.g., negative. Channel 105 or servo signal demodulator 204 includes an appropriate low-pass filter that converts a regular sequence of pulses into a nearly sinusoidal waveform in time. The DFT yields sine and cosine outputs for both the A and B (or left and right legs of the V's) portions of chevrons 450. Because chevrons 450 are periodically repeated in the radial direction on disk 20, the sine and cosine components also vary sinusoidally with respect to radius as shown in the upper portion of FIG. 8. As head 16 scans to the right across chevrons 450, the output is sampled only in burst sample windows 454, 458 to minimize the fuzzy effect of ends 456. Chevrons 450 in burst sample window 454 are labeled "A", and chevrons 450 in burst sample window 458 are labeled "B". It can be seen from FIGS. 5 and 8 that the sinusoidal output from chevrons 450 varies periodically with radius (such as with a period of 2 times the slant height as shown in FIG. 5). The corresponding variations of the trigonometric sines and cosines of the phase angles are shown in the upper portion of FIG. 8 as the radius changes.

Gray code 440 values are nominally constant for one-half cycle of chevrons 450. However, the gray code transitions are fuzzy as suggested by the overlapping rectangles in the "Gray even" and "Gray odd" rows of FIG. 8. The unique selection of gray code 440 can be made from chevron 450 phase information as shown below.

Calculations of the burst phases A and B from the sine and cosine values from channel 105 or servo signal demodulator 204 DFT give the principal values which are in the ranges of $-\pi<A<=\pi$ and $-\pi<B<=\pi$. Normalized phase angles defined as $a=A/2\pi$ and $b=B/2\pi$ range over $-\frac{1}{2}$ to $+\frac{1}{2}$ as gray code elements 444 change by 2 in one preferred embodiment. The normalized principal angles, a and b, are shown as inclined line segments in the middle portion of FIG. 8. The discontinuities or jumps of the normalized principal angles, a and b, occur in the middle of zones where gray code elements 444 are well-defined odd numbers. The mathematical definition of the principal values can be adjusted to assure this condition.

The normalized principal values, a and b, are continuous near the centers of the regions where gray code 440 is an even integer. In such regions, a continuous position coordinate called "cycle" (shown in FIG. 8 as line 720) is first defined as Cycle=Gray Code Value+$b-a$ In the ambiguous zones (ends 448 of gray code elements 444), gray code 440 may also be read as an odd integer. Such an ambiguous region is shown at radius 710. If the gray code is still read as an even integer, no adjustment is made. However, an odd value of gray code 440 is modified by Cycle=Cycle+$(a>0)-(b>0)$ wherein the quantities in parentheses have a zero value if the contained expression is false and have a value of one if the contained expression is true. The result is a continuous value for cycle 720 even if "a" and/or "b" jump where gray code 440 is odd. Track positions can be assigned as an arbitrary function of cycle 720. That is, there does not have to be a one-to-one correlation between gray code 440 and the number of tracks.

Rather, the gray code 440 increment may correspond to several tracks. Furthermore, the gray code 440 increment may even correspond to non-integer tracks. For example, tracks can be placed closer together if head 16 is narrow or placed closer together at the inner diameter and/or the outer diameter of disk 20 with a smoothly varying (e.g., parabolic) distribution across the head 16 stroke. In addition, to optimize the total capacity of disk drive 10, the ratio of gray code 440 increments to tracks may be adjusted, for example, to trade-off stronger heads or radial zones of the various disk surfaces.

The hybrid servo pattern facilitates making corrections or adjustments for eccentricity in the tracks of disk 20. Printing processes may produce patterns with large eccentricity, e.g., up to 100 microns or more and tolerances in disk drive 10 may increase or contribute to the eccentricity. The hybrid servo pattern is useful as a reference for self-servowriting or as the final servo pattern without servo rewriting. For both of these processes, calculations based on the measured system response can correct the apparent position errors to form a nearly perfect circular position centered on the axis of rotation for disk 20. This corrected circular path can then be maintained while a final servo pattern is written in self-servowriting.

If the servo pattern is not rewritten, the hybrid servo pattern can be used with or without correcting the eccentricity. A simple approach involves following the eccentric hybrid servo pattern and writing the tracks and then later reading the written tracks with the same eccentricity. Alternatively, the corrections for eccentricity can be computed in a conventional manner (known to those skilled in the art) and then the eccentricity corrections may be used during both writing and reading of data to and from the tracks.

These eccentricity corrections for runout can be written in special reserved areas of the disk surface.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. For example, phase demodulation of the signals from chevrons 450 may be performed in a number of ways such as taught in U.S. Pat. No. 3,686,649 to Behr, which is incorporated herein in its entirety by reference.

We claim:

1. A magnetic disk for storing information readable by a head of a disk drive, the disk comprising:
   a track;
   data sectors in the track for magnetically storing user data that is readable by the head; and
   servo sectors in the track for magnetically storing a servo pattern that is readable by the head, wherein the servo sectors are interspersed between the data sectors, the servo pattern in each of the servo sectors includes first position elements and second position elements, the second position elements are inclined relative to the first position elements and have relatively straight elongated edges that continuously extend radially and circumferentially relative to the disk, and a combination of the first and second position elements provides alignment information for the disk drive to align the head with a radius of the disk.

2. The disk of claim 1, wherein the second position elements are nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

3. The disk of claim 2, wherein the first side second linear element is inclined at an inclination angle of at least about 20 degrees as measured from a local isochrone and the second side second linear element is inclined at an inclination angle of at least about negative 20 degrees as measured from the local isochrone.

4. The disk of claim 1, wherein the first position elements provide coarse position information and the second position elements provide fine position information.

5. A method of providing a servo pattern on a disk, wherein the servo pattern provides servo information for positioning a head relative to the disk in a disk drive, the method comprising:
   recording a servo address mark (SAM) providing a sync signal to read a following gray code;
   recording the gray code in first linear elements for providing identification data of a track on the disk; and
   recording fine position information in second linear elements that are inclined relative to the first linear elements, wherein the second linear elements are arranged as first and second sides of nested chevrons, a circumferential distance between a first side second linear element and a second side second linear element of each of the chevrons provides an indication of relative radial position, and a continuous radial strip of the disk circumferentially extends between and is spaced from the first and second side second linear elements, radially extends beyond the second linear elements towards an inner diameter and an outer diameter of the disk and contains no servo information;
   wherein the SAM, the gray code, and the second linear elements are recorded within a servo sector on the disk.

6. The method of claim 5, wherein the second linear elements have relatively straight elongated edges that continuously extend radially and circumferentially relative to the disk.

7. The method of claim 6, wherein the first side second linear element of each chevron is inclined at an angle of at least about 20 degrees relative to a local isochrone and the second side second linear element of each chevron is inclined at an angle of at least about negative 20 degrees relative to the local isochrone.

8. The method of claim 5, wherein the nested chevrons provide a periodic signal when read by the head that enables phase resolution to recover the fine position information.

9. The method of claim 5, wherein the recording steps are performed on the disk prior to inserting the disk in the disk drive.

10. The method of claim 5, wherein the recording steps are performed by printing.

11. A disk drive, comprising:
    a disk for storing and retrieving information;
    tracks arranged approximately concentrically on the disk;
    a servo pattern embedded in servo sectors in the tracks, wherein the servo pattern in each of the servo sectors includes gray code and chevrons, the gray code provides chevron cycle number identification and the chevrons provide fine position information;
    a head for reading the servo pattern to generate read information; and
    a servo signal demodulator for recovering the fine position information from the read information, wherein the servo signal demodulator processes the read information to selectively sample portions of the chevrons without sampling other portions of the chevrons.

12. The disk drive of claim 11, wherein the fine position information is encoded in pairs of inclined linear elements with transverse axes.

13. The disk drive of claim 12, wherein each pair of the inclined linear elements is arranged as spaced legs of a V-pattern without a vertex.

14. The disk drive of claim 13, wherein the pairs of the inclined linear elements are stacked and the head reads the pairs of the inclined linear elements to provide a periodic signal.

15. The disk drive of claim 14, wherein the servo signal demodulator demodulates the periodic signal to recover the fine position information.

16. The disk drive of claim 15, wherein the servo signal demodulator demodulates the periodic signal using a discrete Fourier transform.

17. The disk drive of claim 16, wherein the servo signal demodulator sets burst sample windows to sample interior portions of the inclined linear elements without sampling ends of the inclined linear elements.

18. The disk drive of claim 11, including a processor for determining an eccentricity correction based on the read information.

19. The disk drive of claim 18, wherein the processor uses the eccentricity correction to write a final servo pattern on the disk.

20. The disk drive of claim 18, wherein the processor uses the eccentricity correction to control read and write operations of the disk drive.

21. The disk drive of claim 11, including a processor for combining the gray code recovered from the read information and the fine position information recovered from the read information and issuing a servo position command signal in response to the recovered gray code and the recovered fine position information.

22. The disk drive of claim 21, including a servo controller for receiving the servo position command signal and issuing an input command signal to a head positioner to align the head with a radius of the disk in response to the servo position command signal.

23. The disk drive of claim 22, wherein the input command signal includes a fast seek signal based on the recovered gray code and a settle-to-track signal based on the recovered fine position information, and the head positioner responds to the fast seek signal by radially positioning the head within a seek range of a selected chevron and responds to the settle-to-track signal by finalizing the alignment of the head with the radius.

24. The disk drive of claim 23, wherein the seek range is within about one unit from the center of the selected chevron.

25. A method of obtaining servo position data from a rotating magnetic disk having approximately concentric tracks divided into alternating servo sectors and data sectors, wherein a servo pattern is embedded in the servo sectors, the servo pattern in each of the servo sectors includes gray code and fine position elements, the gray code includes track identification data for a desired radius of the disk and the fine position elements include fine servo position data, the method comprising:
    reading the servo pattern to recover the track identification data and to generate a periodic analog signal;
    sampling the periodic analog signal at a first burst sample window and at a second burst sample window to generate signal samples, wherein the burst sample windows selectively sample portions of the fine position elements without sampling other portions of the fine position elements;
    demodulating phases of the signal samples to recover the fine servo position data for the desired radius; and
    processing the recovered track identification data and the recovered fine servo position data to produce alignment data for the desired radius.

26. The method of claim 25, wherein the periodic analog signal is generated by reading at least one pair of oppositely inclined fine position elements.

27. The method of claim 26, wherein the burst sample windows sample interior portions of the fine position elements without sampling ends of the fine position elements.

28. The method of claim 27, wherein the demodulating includes performing sine and cosine discrete Fourier transforms of the signal samples.

29. A disk drive, comprising:
    a disk having a hybrid servo pattern printed thereon, wherein the hybrid servo pattern includes gray code elements and chevrons;
    a head that is positioned relative to the disk using the gray code elements and the chevrons; and
    a demodulator that selectively samples an analog signal generated by the head in response to reading a selected chevron to provide a sampled signal for positioning the head relative to the disk, wherein the sampled signal includes a desired portion of the analog signal provided by a relatively straight magnetic transition edge of the chevron, and the sampled signal excludes an undesired portion of the analog signal provided by a fuzzy magnetic transition edge of the chevron.

30. The disk drive of claim 29, including a controller that uses the chevron to resolve an ambiguity between selected gray code elements.

31. The disk drive of claim 29, including a controller that uses the hybrid servo pattern for self-servowriting a final servo pattern on the disk.

32. The disk drive of claim 31, wherein the disk includes servo sectors and data sectors, the servo sectors are interspersed between the data sectors, the final servo pattern is written into the servo sectors and user data is written into the data sectors.

33. The disk drive of claim 29, wherein the chevrons include oppositely inclined linear elements that are spaced from one another and arranged as spaced legs of a V-pattern without a vertex such that imaginary lines that are co-extensive with and extend from the linear elements intersect with one another at the vertex and no servo information is located at the vertex.

34. The disk drive of claim 29, wherein the chevrons provide phase-to-position information.

35. A method, comprising:
    providing a disk having a hybrid servo pattern printed thereon, wherein the hybrid servo pattern includes gray code elements and chevrons;
    providing a head that reads and writes to and from the disk;
    generating an analog signal using the head to read a selected chevron;
    selectively sampling the analog signal to provide a sampled signal for positioning the head relative to the disk, wherein the sampled signal includes a desired portion of the analog signal provided by a relatively straight magnetic transition edge of the chevron, and the sampled signal excludes an undesired portion of the analog signal provided by a fuzzy magnetic transition edge of the chevron; and
    positioning the head relative to the disk using a selected gray code element and the sampled signal.

36. The method of claim 35, including reading the chevron to resolve an ambiguity between selected gray code elements.

37. The method of claim 35, including self-servowriting a final servo pattern on the disk using the hybrid servo pattern.

38. The method of claim 37, including writing the final servo pattern into servo sectors on the disk, and writing user data into data sectors on the disk, wherein the servo sectors are interspersed between the data sectors.

39. The method of claim 35, wherein the chevrons include oppositely inclined linear elements that are spaced from one another and arranged as spaced legs of a V-pattern without a vertex such that imaginary lines that are co-extensive with and extend from the linear elements intersect with one another at the vertex and no servo information is located at the vertex.

40. The method of claim 35, wherein the chevrons provide phase-to-position information.

41. A disk drive, comprising:
    a disk for storing and retrieving information;
    tracks arranged approximately concentrically on the disk;
    a servo pattern embedded in servo sectors in the tracks, wherein the servo pattern in each of the servo sectors includes gray code and fine position information, and the gray code provides chevron cycle number identification;
    a head for reading the servo pattern to generate read information;
    a servo signal demodulator for recovering the fine position information from the read information; and a processor for determining an eccentricity correction based on the read information.

42. The disk drive of claim 41, wherein the processor uses the eccentricity correction to write a final servo pattern on the disk.

43. The disk drive of claim 41, wherein the processor uses the eccentricity correction to control read and write operations of the disk drive.

44. The disk drive of claim 41, wherein the servo pattern includes gray code elements and chevrons, the gray code elements provide the gray code and are substantially radial relative to the disk, and the chevrons provide the fine position information and are inclined relative to the gray code elements.

45. The disk drive of claim 44, wherein the gray code elements are first linear elements that are spaced from one another and the chevrons are second linear elements that are spaced from one another.

46. The disk drive of claim 45, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

47. The disk drive of claim 46, wherein the first side second linear elements are inclined at least about 20 degrees relative to the first linear elements and the second side second linear elements are inclined at least about negative 20 degrees relative to the first linear elements.

48. The disk drive of claim 46, wherein the first side second linear elements have identical shapes, sizes and inclinations, the second side second linear elements have identical shapes, sizes and inclinations, and the nested pairs of the second linear elements have identical shapes and sizes and are radially aligned with one another.

49. The disk drive of claim 46, wherein the first linear elements change at a radial displacement interval and radially adjacent nested pairs of the second linear elements are radially spaced from one another by about the displacement interval.

50. The disk drive of claim 46, wherein each bit of the gray code radially extends about one cycle or about two cycles of the chevrons.

51. A disk drive, comprising:
a disk for storing and retrieving information;
tracks arranged approximately concentrically on the disk;
a servo pattern embedded in servo sectors in the tracks, wherein the servo pattern in each of the servo sectors includes gray code and fine position information, and the gray code provides chevron cycle number identification;
a head for reading the servo pattern to generate read information;
a servo signal demodulator for recovering the fine position information from the read information; and
a processor for combining the gray code recovered from the read information and the fine position information recovered from the read information and issuing a servo position command signal in response to the recovered gray code and the recovered fine position information.

52. The disk drive of claim 51, including a servo controller for receiving the servo position command signal and issuing an input command signal to a head positioner to align the head with a radius of the disk in response to the servo position command signal.

53. The disk drive of claim 52, wherein the input command signal includes a fast seek signal based on the recovered gray code and a settle-to-track signal based on the recovered fine position information, and the head positioner responds to the fast seek signal by radially positioning the head within a seek range of a selected chevron and responds to the settle-to-track signal by finalizing the alignment of the head with the radius.

54. The disk drive of claim 51, wherein the servo pattern includes gray code elements and chevrons, the gray code elements provide the gray code and are substantially radial relative to the disk, and the chevrons provide the fine position information and are inclined relative to the gray code elements.

55. The disk drive of claim 54, wherein the gray code elements are first linear elements that are spaced from one another and the chevrons are second linear elements that are spaced from one another.

56. The disk drive of claim 55, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

57. The disk drive of claim 56, wherein the first side second linear elements are inclined at least about 20 degrees relative to the first linear elements and the second side second linear elements are inclined at least about negative 20 degrees relative to the first linear elements.

58. The disk drive of claim 56, wherein the first side second linear elements have identical shapes, sizes and inclinations, the second side second linear elements have identical shapes, sizes and inclinations, and the nested pairs of the second linear elements have identical shapes and sizes and are radially aligned with one another.

59. The disk drive of claim 56, wherein the first linear elements change at a radial displacement interval and radially adjacent nested pairs of the second linear elements are radially spaced from one another by about the displacement interval.

60. The disk drive of claim 56, wherein each bit of the gray code radially extends about one cycle or about two cycles of the chevrons.

61. A method of obtaining servo position data from a rotating magnetic disk having approximately concentric tracks divided into alternating servo sectors and data sectors, wherein a servo pattern is embedded in the servo sectors, the servo pattern in each of the servo sectors includes gray code and fine position elements, the gray code includes track identification data for a desired radius of the disk and the fine position elements include fine servo position data, the method comprising:
reading the servo pattern to recover the track identification data and to generate a periodic analog signal, wherein the periodic analog signal is generated by reading at least one pair of oppositely inclined fine position elements;
sampling the periodic analog signal at a first burst sample window and at a second burst sample window to generate signal samples, wherein the burst sample windows sample interior portions of the fine position elements without sampling ends of the fine position elements;

demodulating phases of the signal samples to recover the fine servo position data for the desired radius; and processing the recovered track identification data and the recovered fine servo position data to produce alignment data for the desired radius.

62. The method of claim 61, wherein the demodulating includes performing sine and cosine discrete Fourier transforms of the signal samples.

63. The method of claim 61, wherein the servo pattern includes gray code elements and chevrons, the gray code elements provide the gray code and the chevrons provide the fine position elements.

64. The method of claim 63, wherein the gray code elements are substantially radial relative to the disk and the chevrons are inclined relative to the gray code elements.

65. The method of claim 64, wherein the gray code elements are first linear elements that are spaced from one another and the fine position elements are second linear elements that are spaced from one another.

66. The method of claim 65, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

67. The method of claim 66, wherein the first side second linear elements are inclined at least about 20 degrees relative to the first linear elements and the second side second linear elements are inclined at least about negative 20 degrees relative to the first linear elements.

68. The method of claim 66, wherein the first side second linear elements have identical shapes, sizes and inclinations, the second side second linear elements have identical shapes, sizes and inclinations, and the nested pairs of the second linear elements have identical shapes and sizes and are radially aligned with one another.

69. The method of claim 66, wherein the first linear elements change at a radial displacement interval and radially adjacent nested pairs of the second linear elements are radially spaced from one another by about the displacement interval.

70. The method of claim 66, wherein each bit of the gray code radially extends about one cycle or about two cycles of the chevrons.

71. A disk drive, comprising:
a disk having a hybrid servo pattern printed thereon, wherein the hybrid servo pattern includes gray code elements and chevrons;
a head that is positioned relative to the disk by reading at least one of the gray code elements and at least one of the chevrons; and
a controller that uses at least one of the chevrons to resolve an ambiguity between at least two of the gray code elements.

72. The disk drive of claim 71, wherein the gray code elements and the chevrons are located in a servo sector on the disk.

73. The disk drive of claim 72, wherein the gray code elements provide coarse position information for positioning the head relative to the disk and the chevrons provide fine position information for positioning the head relative to the disk.

74. The disk drive of claim 73, wherein the gray code elements are substantially radial relative to the disk and the chevrons are inclined relative to the gray code elements.

75. The disk drive of claim 74, wherein the gray code elements are first linear elements that are spaced from one another and the chevrons are second linear elements that are spaced from one another.

76. The disk drive of claim 75, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

77. The disk drive of claim 76, wherein the first side second linear elements are inclined at least about 20 degrees relative to the first linear elements and the second side second linear elements are inclined at least about negative 20 degrees relative to the first linear elements.

78. The disk drive of claim 76, wherein the first side second linear elements have identical shapes, sizes and inclinations, the second side second linear elements have identical shapes, sizes and inclinations, and the nested pairs of the second linear elements have identical shapes and sizes and are radially aligned with one another.

79. The disk drive of claim 76, wherein the first linear elements change at a radial displacement interval and radially adjacent nested pairs of the second linear elements are radially spaced from one another by about the displacement interval.

80. The disk drive of claim 76, wherein each bit of the gray code radially extends about one cycle or about two cycles of the chevrons.

81. A disk drive, comprising:
a disk having a hybrid servo pattern printed thereon, wherein the hybrid servo pattern includes gray code elements and chevrons;
a head that is positioned relative to the disk by reading at least one of the gray code elements and at least one of the chevrons; and
a controller that uses the hybrid servo pattern for self-servowriting a final servo pattern on the disk.

82. The disk drive of claim 81, wherein the disk includes servo sectors and data sectors, the servo sectors are interspersed between the data sectors, the final servo pattern is written into the servo sectors and user data is written into the data sectors.

83. The disk drive of claim 82, wherein the gray code elements provide coarse position information for positioning the head relative to the disk and the chevrons provide fine position information for positioning the head relative to the disk.

84. The disk drive of claim 83, wherein the gray code elements are substantially radial relative to the disk and the chevrons are inclined relative to the gray code elements.

85. The disk drive of claim 84, wherein the gray code elements are first linear elements that are spaced from one another and the chevrons are second linear elements that are spaced from one another.

86. The disk drive of claim 85, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

87. The disk drive of claim 86, wherein the first side second linear elements are inclined at least about 20 degrees relative to the first linear elements and the second side second linear elements are inclined at least about negative 20 degrees relative to the first linear elements.

88. The disk drive of claim 86, wherein the first side second linear elements have identical shapes, sizes and inclinations, the second side second linear elements have identical shapes, sizes and inclinations, and the nested pairs of the second linear elements have identical shapes and sizes and are radially aligned with one another.

89. The disk drive of claim 86, wherein the first linear elements change at a radial displacement interval and radially adjacent nested pairs of the second linear elements are radially spaced from one another by about the displacement interval.

90. The disk drive of claim 86, wherein each bit of the gray code radially extends about one cycle or about two cycles of the chevrons.

91. A method, comprising:
providing a disk having a hybrid servo pattern printed thereon, wherein the hybrid servo pattern includes gray code elements and chevrons;
positioning a head relative to the disk by reading at least one of the gray code elements and at least one of the chevrons; and
reading at least one of the chevrons to resolve an ambiguity between at least two of the gray code elements.

92. The method of claim 91, wherein the gray code elements and the chevrons are located in a servo sector on the disk.

93. The method of claim 92, wherein the gray code elements provide coarse position information for positioning the head relative to the disk and the chevrons provide fine position information for positioning the head relative to the disk.

94. The method of claim 93, wherein the gray code elements are substantially radial relative to the disk and the chevrons are inclined relative to the gray code elements.

95. The method of claim 94, wherein the gray code elements are first linear elements that are spaced from one another and the chevrons are second linear elements that are spaced from one another.

96. The method of claim 95, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

97. The method of claim 96, wherein the first side second linear elements are inclined at least about 20 degrees relative to the first linear elements and the second side second linear elements are inclined at least about negative 20 degrees relative to the first linear elements.

98. The method of claim 96, wherein the first side second linear elements have identical shapes, sizes and inclinations, the second side second linear elements have identical shapes, sizes and inclinations, and the nested pairs of the second linear elements have identical shapes and sizes and are radially aligned with one another.

99. The method of claim 96, wherein the first linear elements change at a radial displacement interval and radially adjacent nested pairs of the second linear elements are radially spaced from one another by about the displacement interval.

100. The method of claim 96, wherein each bit of the gray code radially extends about one cycle or about two cycles of the chevrons.

101. A method, comprising:
providing a disk having a hybrid servo pattern printed thereon, wherein the hybrid servo pattern includes gray code elements and chevrons;
positioning a head relative to the disk by reading at least one of the gray code elements and at least one of the chevrons; and
self-servowriting a final servo pattern on the disk using the hybrid servo pattern.

102. The method of claim 101, including writing the final servo pattern into servo sectors on the disk, and writing user data into data sectors on the disk, wherein the servo sectors are interspersed between the data sectors.

103. The method of claim 102, wherein the gray code elements provide coarse position information for positioning the head relative to the disk and the chevrons provide fine position information for positioning the head relative to the disk.

104. The method of claim 103, wherein the gray code elements are substantially radial relative to the disk and the chevrons are inclined relative to the gray code elements.

105. The method of claim 104, wherein the gray code elements are first linear elements that are spaced from one another and the chevrons are second linear elements that are spaced from one another.

106. The method of claim 105, wherein the second linear elements are radially stacked nested pairs of oppositely inclined second linear elements, and each nested pair includes a first side second linear element and a second side second linear element arranged as spaced legs of a V-pattern without a vertex such that imaginary lines that are co-extensive with and extend from the first and second side second linear elements intersect with one another at the vertex and no servo information is located at the vertex.

107. The method of claim 106, wherein the first side second linear elements are inclined at least about 20 degrees relative to the first linear elements and the second side second linear elements are inclined at least about negative 20 degrees relative to the first linear elements.

108. The method of claim 106, wherein the first side second linear elements have identical shapes, sizes and inclinations, the second side second linear elements have identical shapes, sizes and inclinations, and the nested pairs of the second linear elements have identical shapes and sizes and are radially aligned with one another.

109. The method of claim 106, wherein the first linear elements change at a radial displacement interval and radially adjacent nested pairs of the second linear elements are radially spaced from one another by about the displacement interval.

110. The method of claim 106, wherein each bit of the gray code radially extends about one cycle or about two cycles of the chevrons.

* * * * *